(12) United States Patent
Morel

(10) Patent No.: US 7,440,857 B2
(45) Date of Patent: Oct. 21, 2008

(54) METHOD AND A SYSTEM FOR DETECTING AND LOCATING AN ADJUSTMENT ERROR OR A DEFECT OF A ROTORCRAFT ROTOR

(75) Inventor: Hervé Morel, Lamanon (FR)

(73) Assignee: Eurocopter, Marignane (FR)

( * ) Notice: Subject to any disclaimer, the term of this patent is extended or adjusted under 35 U.S.C. 154(b) by 0 days.

(21) Appl. No.: 11/709,787

(22) Filed: Feb. 23, 2007

(65) Prior Publication Data

US 2008/0114553 A1 May 15, 2008

(30) Foreign Application Priority Data

Nov. 15, 2006 (FR) .................................. 06 09992

(51) Int. Cl.
*G06F 19/00* (2006.01)
(52) U.S. Cl. .......................................... 702/35; 706/20
(58) Field of Classification Search ................... 702/35;
706/20, 913
See application file for complete search history.

(56) References Cited

U.S. PATENT DOCUMENTS

| | | | | |
|---|---|---|---|---|
| 5,268,834 | A * | 12/1993 | Sanner et al. ................. | 700/31 |
| 6,311,924 | B1 | 11/2001 | Ferrer | |
| 6,609,119 | B1 * | 8/2003 | Meghlaoui ..................... | 706/25 |
| 7,363,120 | B2 * | 4/2008 | Aubourg ........................ | 701/3 |
| 2003/0046253 | A1 * | 3/2003 | Shetty et al. ................... | 706/1 |
| 2005/0096873 | A1 * | 5/2005 | Klein .......................... | 702/184 |
| 2005/0125103 | A1 | 6/2005 | Ferrer | |
| 2006/0058927 | A1 | 3/2006 | Aubourg | |

FOREIGN PATENT DOCUMENTS

WO       WO 02/090903       11/2002

OTHER PUBLICATIONS

Morel et al., "Defect detection and tracing on helicopter rotors by artificial neural networks," Advanced process control applications for industry workshop, APC 2005, IEEE, Vacouver 2005, 4 pp.
Morel, "Diagnostic de défauts des rotors d'hélicoptéres: approches connexionnistes pour l'analyse vibratoire," Rapport DEA Modélisation et Conception Assistée par Ordinateru, Ecole Nationale Supérieure des Arts et Métiers, UMR CNRS 6168, 2003.
Morel, "Diagnostic de defauts du rotor de l'helicoptere: supervision de cartes auto-organisatrices avec critere de convergence geometriques", Jun. 2006, pp. 1-12, XP-002441328.

(Continued)

*Primary Examiner*—Bryan Bui
*Assistant Examiner*—Jonathan Moffat
(74) *Attorney, Agent, or Firm*—Young & Thompson

(57) ABSTRACT

The invention relates to a method of detecting and identifying a defect or an adjustment error of a rotorcraft rotor using an artificial neural network (ANN), the rotor having a plurality of blades and a plurality of adjustment members associated with each blade; the network (ANN) is a supervised competitive learning network (SSON, SCLN, SSOM) having an input to which vibration spectral data measured on the rotorcraft is applied, the network outputting data representative of which rotor blade presents a defect or an adjustment error or data representative of no defect, and where appropriate data representative of the type of defect that has been detected.

23 Claims, 6 Drawing Sheets

OTHER PUBLICATIONS

Samuel et al., "A review fo vibration-based techniques for helicopter transmission diagnostics", Oct. 2004, pp. 475-508, Journal of Sound and Vibration, vol. 282, XP-002441329.125.

Diwakar et al., "An intelligent system for integrated predictive diagnosis", Mar. 1998, pp. 179-183, XP-002441330.

Rahman et al., "Multiple classifier decision combination strategies for character recognition: A review", Jun. 2003, pp. 166-194, International Journal on Document Analysis and Recognition (IJDAR), XP-002441331.

Sharkey, "Combining Artificial Neural Nets, Ensemble and Modular Multi-Net Systems", Jun. 1998, pp. 1-30, XP-002441332.

Dujardin et al., "Multi-Neural Networks Approaches for Biomedical Applications: Classification of Brainstem Auditory Evoked Potentials", Jul. 1999, pp. 3609-3613, XP-002441333.

* cited by examiner

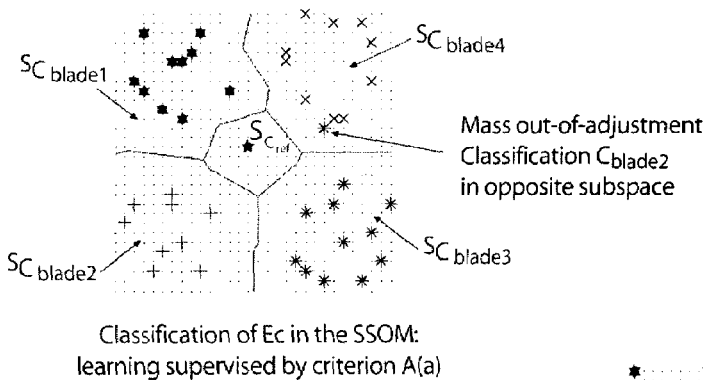
Classification of Ec in the SSOM:
learning supervised by criterion A(a)
Fig.7
Fig.8
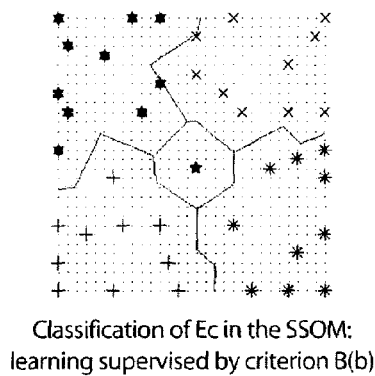
Classification of Ec in the SSOM:
learning supervised by criterion B(b)
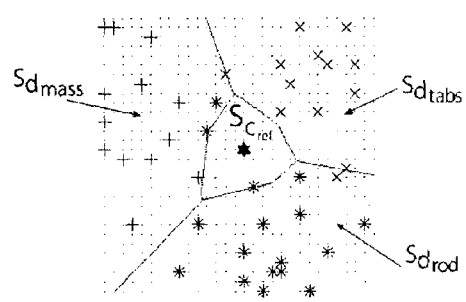
Classification of Ec in the SSOM:
learning supervised by criterion A(a)
Fig.9
Fig.10
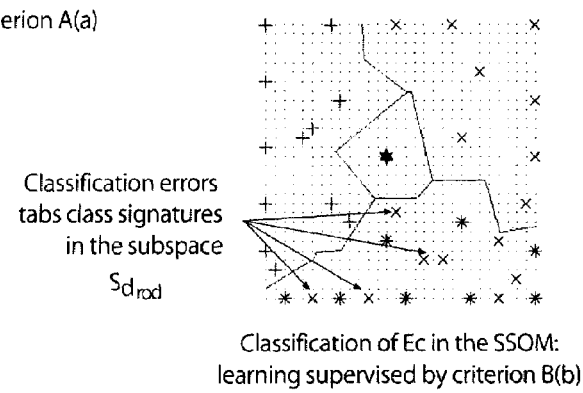
Classification of Ec in the SSOM:
learning supervised by criterion B(b)

Fig. 11
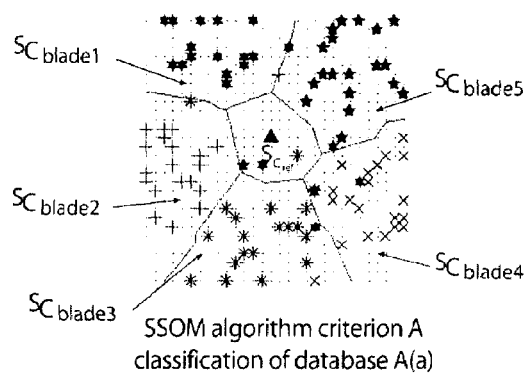
SSOM algorithm criterion A
classification of database A(a)
Fig. 12
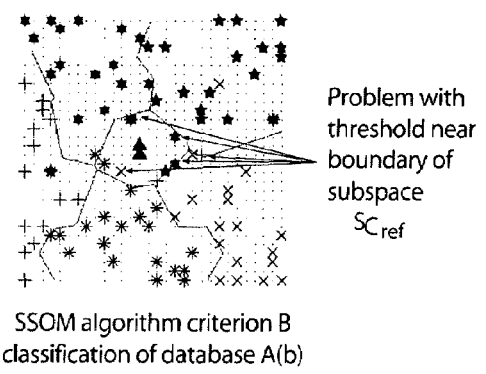
SSOM algorithm criterion B
classification of database A(b)
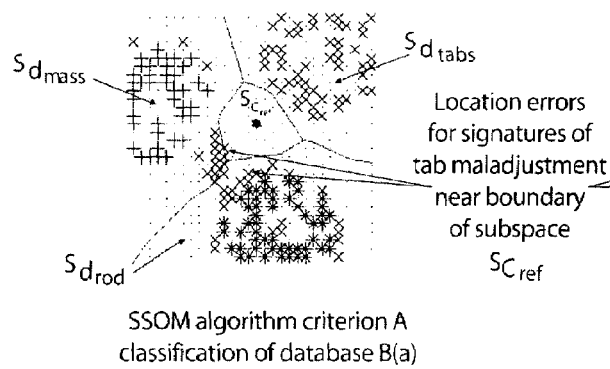
SSOM algorithm criterion A
classification of database B(a)
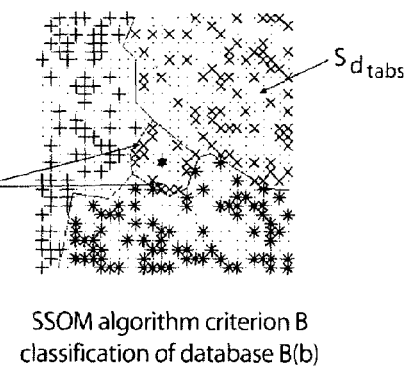
SSOM algorithm criterion B
classification of database B(b)
Fig. 13
Fig. 14

METHOD AND A SYSTEM FOR DETECTING AND LOCATING AN ADJUSTMENT ERROR OR A DEFECT OF A ROTORCRAFT ROTOR

A claim of priority is made to French patent application 06-0992.

The present invention relates to a method and to a system for detecting and locating an adjustment error or a defect of a rotorcraft rotor.

FIELD OF THE INVENTION

The technical field of the invention is that of manufacturing helicopters.

The present invention applies in particular to diagnosing a rotorcraft rotor by analyzing vibration that is generated, at least in part, by the operation of the rotor.

BACKGROUND OF THE INVENTION

In order to measure vibration, the rotorcraft is fitted with accelerometers that are placed (secured) on the casing(s) of the gearbox(es), on the bearings of shafts, and/or on other points of the structure of the helicopter.

In flight, the signals delivered by these sensors can be converted into data, and where appropriate synchronized (by using signals delivered by a rotation sensor), and/or "averaged", and then recorded by the imbedded system.

On returning to the ground, the recorded data can be collated and analyzed. Interpreting such data is complex: it requires lengthy intervention by an expert.

Known tools for automatically analyzing such data in order to diagnose a mechanical defect in a mechanism are incomplete and imperfect; there are existing defects which such tools fail to detect, and they sometimes generate indications of a defect when none is justified.

An object of the invention is to provide a method of analyzing such data, an analysis program, and a device including the program, making it possible to draw up quickly a diagnosis that is reliable, i.e. that maximizes the percentage of real defects detected while minimizing the percentage of defect detections that are not confirmed.

A rotorcraft rotor, in particular a propulsion and lift rotor of a helicopter, conventionally comprises a plurality of mechanical members that are adjustable or displaceable, referred to as adjustment members, having setting or configuration values that have a considerable influence on the vibration produced while the rotorcraft is in operation; these members include balance flyweights secured to each blade or to each structure (sleeve) for securing a blade to the rotor hub and of mass that can be adjusted, tabs secured to each blade and of orientation that can be modified, and members for adjusting the lengths of pitch control rods respectively associated with each of the blades.

Among the defects of mechanical elements of a rotor that have an influence on a vibratory signature of the helicopter, mention can be made of slack in bearings and in fastenings, and also to degraded mechanical characteristics of a part due to aging, such as a change in its stiffness or in the damping provided by a lag damper, for example.

These adjustment means can be used for adjusting the respective resonant frequencies of the blades corresponding to their second mode in flapping, as described in patent U.S. Pat. No. 6,311,924.

Patents WO-02/090903, US-2005-125103, and US-2006-058927 describe methods of detecting adjustment errors or defects of a rotorcraft rotor in order to adjust the adjustment members so as to minimize vibration levels.

In those methods, a neural network is used illustrative of the relationship between accelerations (vibrations) and adjustment parameters or defects. The acquisition of vibration measurements from which vibratory signatures are calculated generally requires flights to be performed in the presence of defective mechanical elements on the rotor in various different configurations of defects and adjustment errors: a properly adjusted defect-free rotor; a rotor without any defects but with adjustment error concerning its flyweights, its pitch rods, and/or its tabs; and a rotor without adjustment error but including a defective member.

An artificial neural network (ANN) is a calculation model of design inspired on the operation of biological neurons, and it is generally optimized by a statistical type learning method. An ANN generally comprises a multitude of calculation units of identical structure referred to as artificial neurons (AN) that are organized in layers.

Each AN is generally characterized by synaptic weights, a combination or aggregation function (e.g. summing) of inputs weighted by the synaptic weights, and an activation function that defines the output from the neuron as a function of the result of the combination function when compared with a threshold.

Each ANN is characterized in particular by the topology of the connections between its neurons, the types of combination and activation functions, and by the learning method, i.e. iterative modification of the values of the synaptic weights.

These methods include supervised learning methods in which the ANN is forced to converge on a predefined state or output, and non-supervised methods.

Among such methods, a distinction is also made between competitive learning methods in which only a fraction of the weights are modified during an iteration, i.e. only the weights of a "winning" or "elected" neuron, possibly together with the weights of neurons close to the elected neuron.

A self-organized map (SOM), or Kohonen map, is a particular ANN generally comprising a single layer of neurons with a binary output (in particular equal to zero or one), and in which non-supervised learning is competitive: at each instant, only one neuron, in theory, is "active" or "elected", i.e. the neuron having weights that are the closest to the input data under consideration.

The documents "Diagnostic de défauts des rotors d'hélicoptères: approches connexionnistes pour l'analyse vibratoire" [Diagnosing helicopter rotor defects: connectionist approaches for vibratory analysis] by H. Morel, in Rapport DEA Modélisation et conception Assistée par Ordinateur, published by Ecole Supérieure des Arts et Métiers, UMR CNRS 6168, 2003, and "Defect detection and tracing on helicopter rotor by artificial neural networks" by H. Morel et al., Advanced Process control Applications for Industry Workshop, APC2005, IEEE, Vancouver, 2005, propose using self-organizing maps to diagnose helicopter rotor defects.

OBJECTS AND SUMMARY OF THE INVENTION

In spite of certain advantages provided by those methods, there remains a need for methods that are reliable and effective in detecting and identifying (locating) one or more members, in particular adjustment members, that are responsible for high levels of vibration, in order to reduce the cost of (regular) inspection operations to check that a rotorcraft is operating properly. The invention seeks to satisfy this need.

A particular object of the invention is to propose such methods, and also programs, devices, and systems implementing these methods, that are improved and/or that remedy, at least in part, the shortcomings or drawbacks of prior art diagnosis methods and systems.

According to an aspect of the invention, it is proposed to make use of an ANN with supervised competitive learning (referenced below as "SCLN", "SSON", or "SSOM") in order to detect whether or not a rotorcraft rotor includes a defect or adjustment error in order to determine, where appropriate, which blade (i.e. which angular sector corresponding to a blade) of the rotor presents the defect or adjustment error that has been detected, and also the nature or the location of the defect or adjustment error that has been detected.

Competitive learning enables the algorithm to avoid converging on a "steady" state that does not correspond to a learning error minimum, and this is not possible with various other algorithms such as an error back-propagation algorithm.

In general, an ANN with competitive learning is better adapted to diagnosing defects or adjustment errors than are other ANNs, such as multilayer perceptrons or networks with radial basis functions.

It has been found that an ANN with supervised competitive learning makes it easier to detect and distinguish defects and adjustment errors of a rotorcraft rotor on the basis of modulus and phase data concerning vibration measured on the rotorcraft.

In an implementation of the invention, a measured vibration spectrum data sequence is applied to the input of the network, i.e. a sequence of (modulus and phase) acceleration data pairs corresponding to certain frequencies, and in particular to certain harmonics of the frequency of rotation of the rotor, the network outputting data representative of which rotor blade presents a defect or an adjustment error, or data representative of the absence of any such defect or adjustment error, and where appropriate data representative of the type of defect or adjustment error that has been detected (from a set of predetermined types of defect or adjustment error).

Each spectral data sequence, which can be referred to as a "spectral signature", forms a vector in which each component is one data measurement, i.e. one modulus or phase value of the measured acceleration at a determined frequency or harmonic.

In an aspect of the invention, the SCLN includes a "competitive" layer of "competitive" neurons, each having synaptic weights of number equal to the (common) dimension of the spectral data vectors used, the number of competitive neurons being not less than the dimension of said vectors, and preferably greater than said dimension.

In an embodiment, the ratio of the number of competitive neurons to the dimension of the data vectors is of the order of at least two or three, in particular of the order of five, ten, or twenty, approximately.

Putting these competitive neurons into competition consists in determining the neuron whose associated vector, i.e. sequence, of synaptic weights is closest to a spectral data vector presented to the input of the layer of competitive neurons. For this purpose, it is possible in particular to calculate a Euclidean distance between these vectors.

After determining the respective proximities of the competitive neurons with a data vector presented at the input and while the ANN is learning, there are several methods for iteratively modifying the synaptic weights of the competitive neurons that can be used.

These methods differ in particular by whether or not weights of one or more neurons distinct from the elected neuron is/are modified, and also by the modification method that is selected.

In an embodiment, a supervised vector quantization algorithm is used for this purpose, in particular an algorithm selected from algorithms of the following types: LVQ1, OLVQ1, LVQ2, LVQ2.1, LVQ3, MLVQ3, GLVQ, DSLVQ, RLVQ, GRLVQ.

Amongst these algorithms, it is possible to select the algorithm that presents a high classification rate and/or low variance, with the help of a method of statistical validation by resampling, of the cross-validation type or the bootstrap type.

In another implementation, a supervised self-organizing network (SSON) is used in which the dimension of its output space, that could be equal to one, is preferably equal to two or three; when this dimension is equal to two, such a network can be qualified as a supervised self-organizing map (SSOM).

An SSON is characterized in particular by using a neighborhood function for weighting the modification to the synaptic weights of a competitive neuron as a function of the distance between the elected neuron and the competitive neuron as "measured" in the output space.

Because of the supervision, images of vectors presented as inputs and constituting members of distinct classes of defect or adjustment error do not become interleaved and/or superposed in the output space. Consequently, when the network is being used operationally to classify a signature, it is easier to interpret results.

Various methods can be used for supervising such algorithms.

In a first method, data is added (concatenated) to each spectral data vector used while the network is learning, which data is representative of whether the vector in question is a member of a class corresponding to a determined type of defect or adjustment error.

In another method, which is applicable to an SSON, a partitioning of the output space into subspaces is defined, and the weights of the competitive neurons are modified as a function of whether they are members of one or another of these subspaces.

In a preferred implementation, this partitioning presents a "configuration" that is regular (equal-area), radial, and centered, and the number of subspaces of the partitioning is equal to the number of classes (types) of defect and/or adjustment error, plus one.

This partitioning can be defined by determining, for all or some of the classes, the coordinates in the output space of a "setpoint" neuron that is associated with a class of defect or adjustment error; the boundary between two adjacent subspaces associated respectively with two setpoint neurons can be a Voronoï boundary.

While the network is learning, this partitioning can be used in particular in application of one or the other of the following two methods:

- the neighborhood function can be centered on the neuron corresponding to the barycenter in the output space of the elected neuron and of the setpoint neuron corresponding to the class of the current spectral data vector; or else
- competition can be restricted to the neurons of the subspace corresponding to the class of the current spectral data vector.

In other implementations of the invention, a plurality of networks are used that are connected in series, connected in parallel, and/or redundant.

In a particular implementation of the invention, a method is provided of detecting and identifying a defect or an adjustment error of a rotorcraft rotor, the rotor having a plurality of blades and a plurality of adjustment members associated with each blade, which method comprises the following steps:

using a supervised first competitive learning network SCLN1 to determine data identifying at least one "defective" sector of the rotor, and in particular a blade that is defective or out of adjustment; and using an (optionally supervised) second competitive learning network to determine data identifying at least one defect or adjustment error present in the identified defective sector (blade).

At least some of the operations during the learning stage and/or during the diagnosis stage of a method of the invention can be implemented by an electronic data processor unit, such as a computer operating under the control of a program.

Thus, in another aspect of the invention, a program is provided comprising code stored on a medium, such as a memory, or embodied by a signal, the code being readable and/or executable by at least one data processor unit, such as a processor on board a rotorcraft, in order to detect and locate any defects or adjustment errors of a rotorcraft rotor, the code comprising code segments for performing respective operations of a method of the invention.

In another aspect, the invention provides a diagnosis system for a rotorcraft rotor, the system comprising:

a read member for reading a data medium and arranged to read data corresponding to measurements taken on the rotorcraft;

a database containing reference vibratory signature data for the rotorcraft;

a device for transforming the measurement data from the time domain to the frequency domain, which device is connected to the read member to receive therefrom the measurement data and to output vibratory signatures for analysis; and a calculation member connected to the database and to the transformation device and programmed to perform the operations of a method of the invention.

BRIEF DESCRIPTION OF THE DRAWINGS

Other aspects, characteristics, and advantages of the invention appear in the following description which refers to the accompanying drawings that show preferred implementations of the invention without any limiting character.

FIGS. 7 to 14 are diagrams showing various partitionings of an output space of an SSOM and the corresponding Voronoï diagrams, together with the positions of neurons representative of defect classes and setpoint neurons.

MORE DETAILED DESCRIPTION

The classification of spectral data of unknown class for detecting a possible defect or adjustment error of a rotorcraft rotor requires prior learning by an ANN.

Supervised learning consists in establishing a non-linear algebraic relationship (by calculating synaptic weights), on the basis of pairs of examples associated two by two: the input vectors (observations) and the output vectors (setpoints). The input vectors characterize the states of a rotor, and the output vectors represent the membership class of the input vector. The purpose of the supervised learning algorithm is to minimize calculated learning error as a function of the synaptic weights of the ANN and as a function of the input and output vectors.

Non-supervised learning is generally used to classify data. It consists in calculating synaptic weights solely on the basis of input vectors having similarity criteria that are unknown a priori, but that are estimated with the help of a metric (e.g. Euclidean distance).

Figure 1:
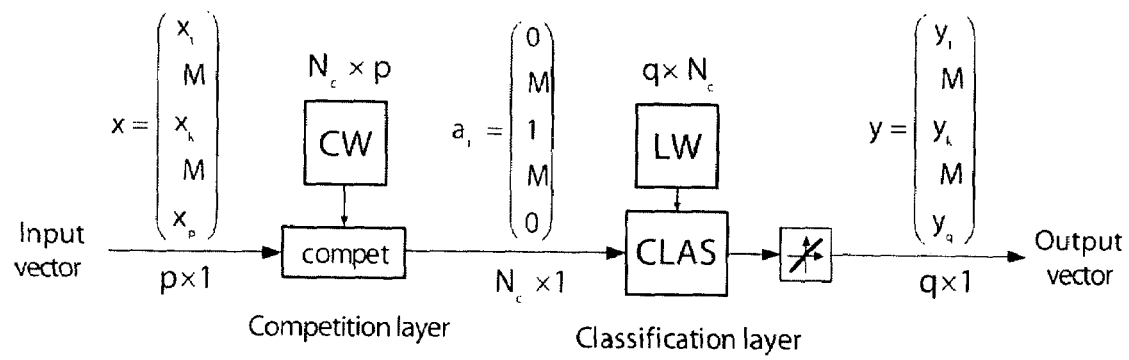
FIG. 1 is a diagram of an SCLN with learning by vector quantization, using a vectorial representation for inputs and outputs and a matrix representation for layers of neurons.

With reference to FIG. 1, an ANN based on vector quantization is generally made up of a "hidden" competitive layer COMPET followed by a classification layer CLAS. The competitive layer contains a number Nc of hidden neurons, the classification layer contains a number $q$ of output neurons, each representative of a membership class of vectors $x(x_1, \ldots, x_p)$ forming a learning database.

The matrix CW represents the matrix of synaptic weights to be calculated during learning; it is constituted by Nc "weight" vectors $m_i$ of dimension $p$: $\dim(m_i) = \dim(x)$.

The matrix LW represents the matrix of the $q$ prototype vectors $LW_i$ ("codebook") of dimension Nc: $\dim(LW_i) = Nc$.

Each prototype vector encodes a class by means of its components equal to 1 in a quantity proportional to the ratio Nc/q, and equal to 0 elsewhere, with the logic sums of the prototype vectors $LW_i$ two by two being zero.

Learning by vector quantization (VQ) is generally of the non-supervised competitive type, the membership information of the vectors of the training database not being used and/or known. The VQ algorithm comprises the following steps:

selecting the initial learning vectors representing q classes;

selecting the parameters (Nc, q, CW, LW) of the structure of the ANN, and then initializing the parameters CW and LW;

selecting the metric used for measuring similarity;

selecting a learning rate $\alpha(t)$; and for each iteration $\underline{t}$ and for each vector $\underline{x}$:

determining which neuron in the competitive layer is the elected neuron $\underline{c}$ in the minimum distance sense (generally the Euclidean distance):

$$c = \underset{i}{\mathrm{argmin}}\{\|x - m_i\|\}$$

modifying the state of the weight vector $m_c$ of the neuron $\underline{c}$ using the following learning rule:

$$m_c(t+1) = m_c(t) + \alpha(t) \cdot [x(t) - m_c(t)]$$

The effect of this rule is to bring the weight vector $m_c$ (of the elected neuron $\underline{c}$) closer to the vector $\underline{x}$ to be learnt. The number of iterations can be set empirically, or can be set once the classifying rate of a set of unlearned vectors reaches a threshold. During the stage of classifying a vector $\underline{x}$, the election process is identical, and then the output from the elected neuron $\underline{c}$ (winner) is set to 1 (0 elsewhere) to form a vector al. The matrix product between al and LW activates the output corresponding thereto to the class estimated for $\underline{x}$.

The algorithms of the learning vector quantization (LVQ) class are supervised versions of the vector quantization VQ algorithm. Unlike the VQ algorithm, if the elected neuron c corresponds to a class other than the membership class of the vector $\underline{x}$ that is presented, then the associated weight vector $m_c$ will be remote. The conditions for initializing and electing competing neurons in LVQ algorithms are identical to those of the VQ algorithm; nevertheless, the way in which weight vectors are modified is different, as explained in detail below.

The rule for modifying the weight vector $m_c$ by the learning vector LVQ1 is applied under the following conditions:

$$m_c(t+1) = m_c(t) + \alpha(t) \cdot [x(t) - m_c(t)]$$

providing the elected neuron $\underline{c}$ and the input vector $\underline{x}$ are of identical class, or $$m_c(t+1) = m_c(t) - \alpha(t) \cdot [x(t) - m_c(t)]$$

when $\underline{c}$ and $\underline{x}$ are of different classes, and then:

$$m_i(t+1) = m_i(t), \forall i \neq c$$

The optimized LVQ1 algorithm OLVQ1 is a variant of LVQ1 to which there is given an optimum learning rate $\alpha c(t)$ specific to each class in order to accelerate convergence. The learning rule is as follows:

$$m_c(t+1) = [1 - s(t) \cdot \alpha_c(t)] m_c(t) + s(t) \cdot \alpha_c(t) \cdot x(t)$$

with the optimum learning rate $\alpha c(t)$:

$$\alpha_c(t) = \frac{\alpha_c(t-1)}{1 + s(t) \cdot \alpha_c(t-1)}$$

where s(t) designates the classification of $m_c(t)$: s(t)=1 if the classification is correct, s(t)=−1 otherwise. If the learning rate $\alpha c(t)$ increases, it is imperative to limit $\alpha c(t)<1$ in order to avoid diverging. During initialization, $\alpha i(t)$ must be defined so that $0.3 < \alpha i(t) < 0.5$.

In the algorithms LVQ2, LVQ2.1, and LVQ3, two weight vectors that are closest in the measurement sense are modified in order to optimize the separation surfaces better. In LVQ2, the nearest two weight vectors are corrected, providing the following conditions are satisfied:

the closest prototype $m_{c1}(t)$ is of incorrect class;
the second closest $m_{c2}(t)$ is of correct class;
the vector $\underline{x}$ to be classified lies in the vicinity of the discriminating boundary in a symmetrical window $\lambda$ separating the weight vectors $m_{c1}(t)$ and $m_{c2}(t)$, defined as follows:

$$\min\left(\frac{d_1}{d_2}, \frac{d_2}{d_1}\right) > \lambda, \lambda = \frac{1-\omega}{1+\omega}, \omega \in [0.2, 0.3]$$

with the following weight vector correction rule:

$$m_{c_1}^{t+1} = m_{c_1}^t + \alpha(t) \cdot [x - m_{c_1}^t]$$

$$m_{c_2}^{t+1} = m_{c_2}^t + \alpha(t) \cdot [x - m_{c_2}^t]$$

The algorithm LVQ2.1 is identical to LVQ2 but the condition for correcting the vectors $m_{c1}(t)$ and $m_{c2}(t)$ apply if one or the other of them are members independently of different classes.

In order to avoid the drift made possible by LVQ2.1, the algorithm LVQ3 integrates a constant factor $\epsilon$ when $m_{c1}(t)$ and $m_{c2}(t)$ are members of the same class as $\underline{x}$; the learning rule then becomes:

$$m_{c_1}^{t+1} = m_{c_1}^t + \epsilon \cdot \alpha(t) \cdot [x - m_{c_1}^t]$$

$$m_{c_2}^{t+1} = m_{c_2}^t + \epsilon \cdot \alpha(t) \cdot [x - m_{c_2}^t]$$

$$0.2 < \epsilon < 0.3$$

A variant MLVQ3 can be used when $m_{c1}(t)$ and $m_{c2}(t)$ are of class different to $\underline{x}$. Under such circumstances, the weights are updated using the following rule:

$$m_{c_1}^{t+1} = m_{c_1}^t - \epsilon \cdot \alpha(t) \cdot [x - m_{c_1}^t]$$

$$m_{c_2}^{t+1} = m_{c_2}^t - \epsilon \cdot \alpha(t) \cdot [x - m_{c_2}^t]$$

$$0.2 < \epsilon < 0.3$$

The generalized LVQ algorithm (GLVQ) is described in "Generalized learning vector quantization" by Sato et al., Advances in Neural Information Processing Systems, Vol. 7, pp. 423-429, MIT Press, 1995. This algorithm is based on minimizing distance by going down the gradient of the minimum classification error (MCE) criterion. By considering $m_{c1}(t)$ and $m_{c2}(t)$ respectively to be the weight vector of identical class and the weight vector of different class that are the closest to $\underline{x}$, the GLVQ learning rule is as follows:

$$m_{c1}(t+1) = m_{c1}(t) + \alpha(t) \cdot \frac{\partial f}{\partial \mu} \cdot \frac{d_2}{(d_1+d_2)^2} \cdot [x(t) - m_{c1}(t)]$$

$$m_{c2}(t+1) = m_{c2}(t) - \alpha(t) \cdot \frac{\partial f}{\partial \mu} \cdot \frac{d_1}{(d_1+d_2)^2} \cdot [x(t) - m_{c2}(t)]$$

with the derivative function applied to $\underline{f}$ being defined as follows:

$$\frac{\partial f}{\partial \mu} = F(\mu) \cdot (1 - F(\mu))$$

and with the sigmoid function $F(\mu,t)$ being defined as follows:

$$F(\mu) = \frac{1}{1 + e^{-\mu}}$$

with $\mu$, the wrong classification coefficient obtained as a function of the distances d1 and d2, the relative distances between the input vector $\underline{x}$ and the weight vectors $m_{c1}(t)$ and $m_{c2}(t)$, being given by:

$$\mu = \frac{d_1 - d_2}{d_1 - d_2}, \mu \in [-1, 1]$$

Other algorithms derived from the principle of minimizing a criterion can be used in order to minimize the impact of redundancy problems contained in learning vectors of large dimension: distinction sensitive LVQ (DSLVQ); relevance LVQ (RLVQ); and generalized relevance LVQ (GRLVQ).

The self-organizing map (SOM) algorithm proposed by T. Kohonen is an unsupervised algorithm based on self-organization of learning vectors based on their similarity. The algorithm projects the input data space of dimension $\underline{p}$ onto a discrete space of small dimension $\underline{q}$ ($1 \leq q \leq 3$), and generally of dimension 2. The architecture of SOMs comprises an input space made up of $\underline{p}$ neurons and an output space having $\underline{q}$ neurons interconnected via p×q synaptic weights.

Figure 2:
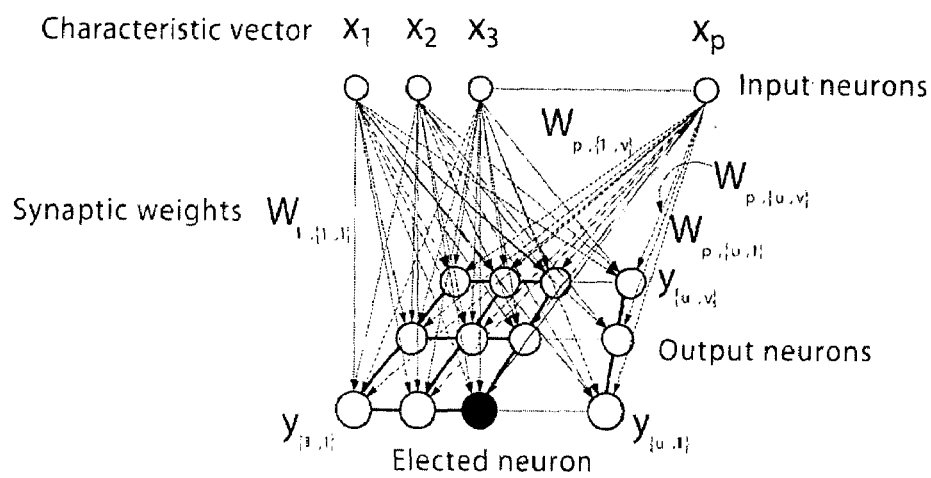
FIG. 2 is a diagram showing an SSON in which the neurons of the output space of dimension two are represented in the form of disks superposed on nodes in a plane square mesh shown in perspective.

FIG. 2 shows the architecture of an SOM having a characteristic space (output space) of dimension 2. The $\underline{q}$ neurons (q=u*v) of the characteristic space of the SOM can be organized in the form of a rectangular or a hexagonal lattice: the notion of neighborhood distance stems from this graphical structure which defines the discrete topology of the SOM. During learning, the notion of neighborhood is introduced using positive and symmetrical neighborhood functions defining the zones of influence of an elected neuron in the sense of minimum distance relative to the adopted metric.

The algorithm of an unsupervised SOM comprises three main operations:
- electing a neuron of the characteristic space of the SOM in the minimum distance sense, considered as being a centering reference for the neighborhood discriminating function to be applied;
- spatially defining, in the characteristic space of the SOM, the topological neighborhood of the excited neighboring neurons, by using the discriminating function; and
- adjusting the synaptic weights of the excited neurons in proportion to the profile of the discriminating function.

These operations are performed for each iteration t and each vector $\underline{x}$ of the learning database:

$$c = \arg\min_i \{\|x - m_i\|\} \Leftrightarrow \|x - m_c\| = \min_i \{\|x - m_i\|\}$$

$$h_{ci}(t) = \alpha(t) \cdot \exp\left[-\frac{\|r_c - r_i\|^2}{2\sigma^2(t)}\right]$$

$$m_i(t+1) = m_i(t) + h_{ci}(t) \cdot [x(t) - m_i(t)]$$

where $\alpha(t)$ is the decreasing learning factor integrated in the definition of $h_{ci}(t)$, defined for $0 < \alpha(t) < 1$, $r_c$ are the coordinates of the elected neuron $\underline{c}$, and $r_i$ are the coordinates of the neurons i of the SOM.

The effect of the self-organization induced by $h_{ci}(t)$ is to order the positions of the characteristic vectors in the characteristic space of the SOM as a function of their relative similarities.

An advantage of SOMs is the small number of parameters that need to be established empirically, unlike most other ANNs. The number J of neurons of the characteristic space has an influence on the granularity of the representation space, but does not have any influence on self-organization. The neighborhood function $h_{ci}(t)$ modifies the uniformity of the self-organization, as a function of its effective initial width $\sigma(0) \cdot \sigma(0)$ generally corresponding to the radius of the SOM, i.e.:

$\sigma(0) = q/2$ for an output space of dimension 1; and
$\sigma(0) = \max(u,v)/2$ for an output space of dimension 2.

Several variants of the basic algorithm for SOMs have been proposed, including supervised SOMs where the supervision information $s_x$ is concatenated with the components of the learning vector $\underline{x}$, thus forming a vector $x_s$ of class defined by means of its structure:

$$x_s = [x \; s_x]^T$$

A rotorcraft rotor having a number B of blades can be resolved into as many (B) angular sectors in which the identical mechanical components that can be defective or out-of-adjustment are the blades, the tabs, the pitch rods, the drag adapters, the sleeves, the spherical abutments, etc. On the basis of this symmetrical configuration, the set $E_c$ of vibratory signatures characteristic of defects or adjustment errors, relative to the B sectors of the rotor, or indeed relative to their natures, can be defined as follows:

Case 1: $E_c$ is the union of the set $C_{ref}$ of signatures representative of an isotropic rotor and the set $C_B$ of defective or out-of-adjustment elements specific to each sector $\underline{b}$ of the rotor ($1 \leq b \leq B$), each containing the subset $d_n$ of defects or adjustment errors ($1 \leq d \leq D$):

$$E_c = C_B \cup C_{ref} = \bigcup_{b=1}^{B} C_b \cup C_{ref}$$

$$C_b = \bigcup_{n=1}^{D} d_n$$

Case 2: $E_c$ is the union of the set $C_{ref}$ of signatures representative of an isotropic rotor and the set $C_D$ of the D defects and adjustment errors, each containing the membership subset $C_b$ of the sector $\underline{b}$ of the rotor:

$$E_c = C_D \cup C_{ref} = \bigcup_{n=1}^{D} d_n \cup C_{ref}$$

$$d_n = \bigcup_{b=1}^{B} C_b$$

In the presence of single elements that are defective, such as the rotor mast or the casing of the gearbox, as many additional classes are taken into account as there are defects to be taken into account. The set $E_c$ becomes the union of $C_B$ or $C_D$, the set $C_{ref}$, and the set of possible defects in the single elements $C_{eu}$, such that:

$$E_c = C_B \cup C_{ref} \cup C_{eu}$$

or else:

$$E_c = C_D \cup C_{ref} \cup C_{eu}$$

In practice, an ANN learning target is to obtain the best compromise between learning performance and estimated generalization performance.

In order to validate and/or compare competitive learning algorithms (LVQ, SOM) on the basis of generalization and learning error, it is possible in particular to make use of the cross-validation method for unbiased generalization error estimation, and/or of a bootstrap method for generalization error variance.

The learning and structural parameters of an LVQ network that have an influence on performance are the number Nc of neurons in the competitive layer, the number $N_{iter}$ of iterations during learning, the learning rate which may in particular be constant, linearly decreasing, or exponentially decreasing, and the mode of initialization.

Other parameters are determined by the content of the signatures: the number $\underline{p}$ of input neurons is equal to the dimension of the signatures, the number $\underline{q}$ of output neurons being equal to the number of membership classes.

By way of example, for input vectors (signatures) of dimension close to 50 or 100, it is possible to select a number Nc of competitive neurons of the order of 100 to 500, and a number of learning iterations likewise of the order of 100 to 1000, e.g. about 500.

It is preferable to use a linearly decreasing learning rate: a constant learning rate finds difficulty in converging on a stable solution, and a learning rate that decreases exponentially refines convergence but involves a large number of iterations.

Learning can be refined as a function of the selected mode of initialization. In particular, initialization of the synaptic weights can consist in forming the matrix CW by a set of learning signatures proportional to the number of neurons per class of the layer COMPET, the signatures being extracted from the learning sample by random number selection.

The supervision algorithm of an SSON/SSOM requires the number $N_c$ of neurons of the characteristic or output space to be set, and also the number $N_{iter}$ of learning iterations, and the neighborhood function.

The mode of initialization may be random and the learning rate may decrease exponentially. The only parameter to be set is the number p of input neurons corresponding to the dimension of the signatures.

The dimension Nc of the characteristic space has an influence on the resolution of the SOM and thus on the precision of the classification, so this dimension may be set to $N_c=30^2$ neurons, i.e. an SOM of dimension 2 formed by a square lattice of 30 neurons per side.

The neighborhood function may be a Gaussian function of effective width (neighborhood) that decreases in the same manner as the learning rate. The recommended effective width corresponds to the radius of the SOM, i.e.

$$\frac{1}{2}N_c.$$

The number of iterations $N_{iter}$ may be set to a value close to 500 to 1000.

Figure 3:
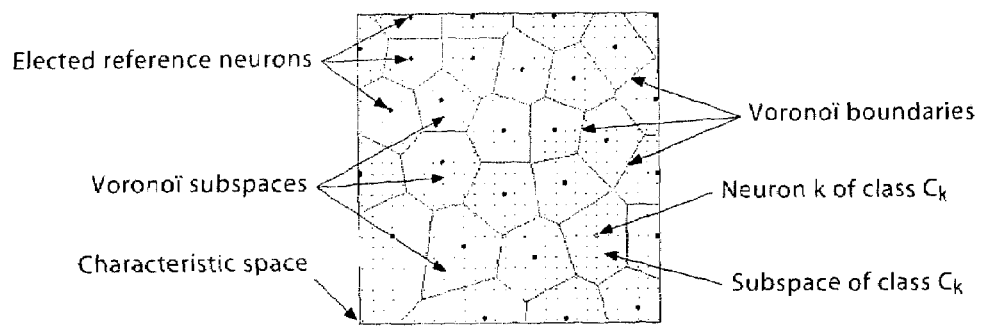
FIGS. 3 to 6 are diagrams showing various mesh configurations for an output space of an SSOM, and the positions of the reference and/or setpoint neurons associated with portions of said space.

Unlike an LVQ network, in an SSON, the membership class $C_k$ of a signature is not represented by a single output neuron, but by a group of neighboring same-class neurons defining a subspace of the characteristic space of the SOM of class $C_k$. Thus, the characteristic space of the SOM may be resolved into subspaces defined by the boundaries of the Voronoï diagram. This diagram is obtained by the coordinates of the elected neurons corresponding to the vibratory signatures that have been learnt, acting as references for the classification stage. Each neuron of the characteristic space then represents the class $C_k$ of the nearest reference neuron. During the classification stage, the class of an unknown signature will be the class $C_k$ of the nearest neighboring reference neuron n (cf. FIG. 3).

Starting from the Voronoï diagram calculated using the sample of learned vibratory signatures, it is possible to use three classification criteria:

classification relative to $C_B$, consisting in determining the sector of the rotor of which the unknown signature is a member, independently of the defect or adjustment error represented;

classification relative to $C_D$, consisting in determining which defect or adjustment error is represented by the unknown signature, independently of rotor sector; and classification relative to $C_B$ and $C_D$, which consists in detecting the sector and/or the blade of the rotor that includes a defective or out-of-adjustment element, and then in locating the element.

In spite of the fact that the performance of a self-organizing network can be better than that of an LVQ network, three classification problems can arise: i) indecision due to electing a neuron that is at the same distance from two reference neurons; ii) errors at the limit of the discriminating boundary; and iii) threshold errors due to the small amplitudes of the defects or the adjustment errors.

Errors involving election of a neuron that is at equal distances from two reference neurons are due to superposing neurons of the SOM lattice and of the Voronoï diagram, in particular at the limit of the characteristic space where the segments of the diagram are parallel to the lattice. This difficulty in allocating a membership class to an elected neuron increases with the complexity of the Voronoï diagram. Selecting a hexagonal lattice can serve to reduce indecision in classification.

Errors concerning limits of the discriminating boundary arise when a signature representative of a learned defect or adjustment error k is of small amplitude, and thus close to the signature that is representative of an isotropic rotor. If the subspace $S_k$ belonging to the membership class $C_k$ corresponding to the defect or adjustment error k does not have a boundary in common with the subspace $S_{ref}$ associated with an isotropic rotor, then the elected neuron can be positioned in a subspace of differing class.

A defect or adjustment error of small amplitude can lead to electing the neuron in the subspace $S_{ref}$ of an isotropic rotor. This error can be ignored.

Problems of indecision and of errors at the limits of the boundaries are minimized by supervising the learning algorithm of the self-organizing network. Supervision serves to group together the subspaces specific to each signature of identical class, considered in $C_B$ or $C_D$, around the reference subspace of signatures representative of an isotropic rotor.

Supervision directs learning as a function of the membership classes of the vibratory signatures defined in $C_B$ or in $C_D$, by allocating a membership class to a neuron or a plurality of neurons of the output space of the network.

Figure 4:
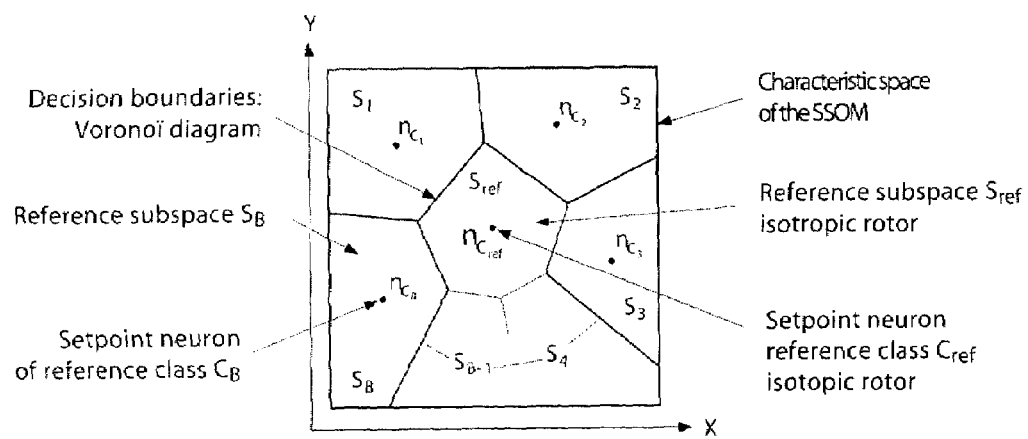

For supervising an SSON, the output space of the network is subdivided into subspaces $S_1, \ldots, S_B$ surrounding a subspace $S_{ref}$ of the reference signature corresponding to an isotropic rotor, the subspaces being approximately equal in area. For a set $E_c$ of vibratory signatures, e.g. made up of the following classes $C_b$:

$$E_c = C \cup C_{ref} = \bigcup_{b=1}^{B} C_b \cup C_{ref}$$

a partitioning of the characteristic space by the Voronoï diagram calculated from B+1 setpoint neurons positioned in the plane of the SOM is defined so as to describe one by one all of the classes of $E_c$ that are to be represented, as shown in FIG. 4.

From this partitioning of the characteristic space, it is possible to use several methods for electing neurons in order to apply the neighborhood function.

For supervised learning of the SOM, the algorithm proceeds to elect the neuron as a function of a supervision criterion, and of the neuron closest to the signature that is being learnt.

An Example of a Supervision Criterion (Criterion A):

For a signature $x_{C_k}$ of class $C_k$, the neuron $n_g\{X_g,Y_g\}$ for centering the neighborhood function is elected from the neuron $n_e\{X_e,Y_e\}$ that is closest to $x_{C_k}$ in the minimum distance sense, and from the setpoint neuron $$n_{C_k}\{X_{n_{C_k}}, Y_{n_{C_k}}\};$$

$$X_g = \frac{X_e + X_{n_{C_k}}}{2}$$

$$Y_g = \frac{Y_e + Y_{n_{C_k}}}{2}$$

Figure 5:
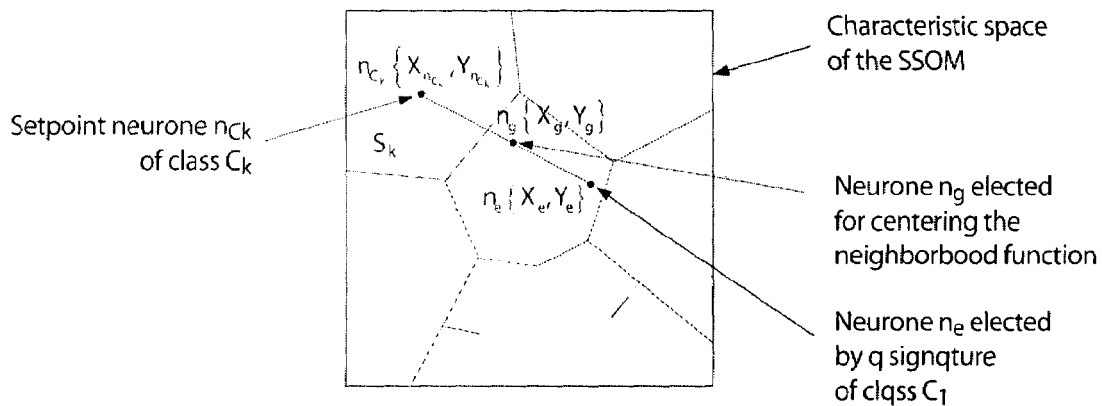

This method brings the learnt signatures of identical class closer around the setpoint neuron of the class under consideration. FIG. 5 shows the election of the neuron for centering the neighborhood function in application of criterion A.

Figure 6:
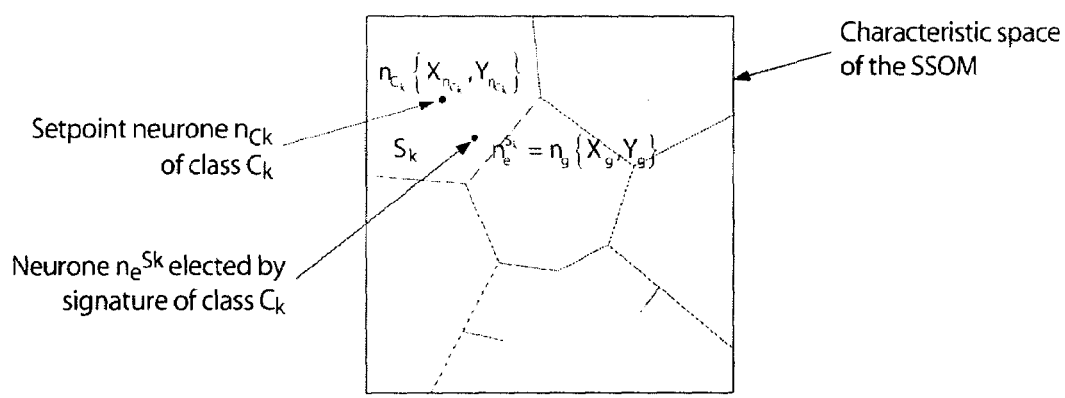

Another Example of a Supervision Criterion (Criterion B):

Criterion B relies on all of the neurons of class $C_k$ positioned in the subspace $S_k$ defined by the boundaries of the Voronoï diagram. The neuron $n_g$ for centering the neighborhood function is the neuron $n_e^{S_k}$ elected in the subspace $S_k$ representative of the class $C_k$, in the minimum distance sense between the signature $x_{C_k}$ of class $C_k$ and the neurons of $S_k$:

$$n_g = n_e^{S_k} = \arg\min_{S_k}(d)$$

where $\underline{d}$ is the vector of calculated distances between the neurons of $S_k$ and the vibratory signature to be learned of class $C_k$ (cf. FIG. 6).

Supervised learning of an SSON/SSOM includes an operation of initializing and organizing the characteristic space of the network into k subspaces as described above, followed by an iterative stage of learning by updating the synaptic weights of the network.

For each learning iteration $\underline{t}$, $t\in[1,N_{iter}]$, for each vibratory signature $x_{C_k}\in E_c$, of dimension $\underline{p}$ and of class $C_k$ represented by the setpoint neuron $n_{C_k}$:

$$x_{C_i}=[x_1\ldots x_i\ldots x_p]^T$$

and for a SOM containing $\underline{q}$ neurons in its characteristic space, connected to the inputs of $\underline{x}$ by the weights $W_j$, $\forall j\in[1,N_c]$:

$$W_j=[W_{j1}\ldots W_{ji}\ldots W_{jp}]^T$$

The algorithm calculates the $\underline{j}$ Euclidean distances $d_j$ corresponding to the $\underline{j}$ neurons of the output space of the SOM, where $\underline{j}$ is equal to $N_c$ if the supervision method corresponding to criterion A is used; if the method corresponding to criterion B is used, then these distances are calculated solely for the neurons of the subspace $S_k$ of the SOM that are of class $C_k$; whence $j=\dim(S_k)$; each distance being calculated as follows:

$$d_j = \sum_{i=1}^{p}\|W_{ji} - x\|$$

The calculated distances form a vector $d(d_1,\ldots,d_j)$ of dimension $\underline{j}$ from which the neuron $n_e$ is determined for which the calculated distance is a minimum:

$$n_e=\arg\min(d).$$

From $n_e$, a new neuron $n_g$ of coordinates $\{X_g,Y_g\}$ is elected in the output space of the SOM, using the selected criterion:

$$n_g=f(n_e,n_{C_k},\text{criterion})$$

The updating of the $\underline{p}$ weights of the $\underline{j}$ neurons of the SOM is performed using the learning rule:

$$W_j^{i+1}=W_j^i+\eta(t)\cdot h_{n_g j}(t)\cdot(x-W_j^i), \forall j\in[1,N_c]$$

where $\eta(t)$ is the learning rate; $\eta_0\approx0.1$ and $\tau_2\approx N_{iter}/2$ are recommended:

$$\eta(t) = \eta_0 \cdot \exp\left(-\frac{t}{\tau_2}\right)$$

and $h_{n_g j}(t)$ is the neighborhood function of the neurons $\underline{j}$ of the SOM around the elected neuron $n_g$ of coordinates $\{X_g,Y_g\}$ being defined by:

$$h_{n_g j}(t) = \exp\left(-\frac{d_{n_g j}^2}{2\sigma(t)^2}\right)$$

where $d_{n_g j}$ is the Euclidean distance between the elected neuron $n_g$ of coordinates $\{X_g,Y_g\}$ and each neuron $\underline{j}$ of coordinates $\{X_j,Y_j\}$:

$$d_{n_g j}=\|n_g-j\|$$

$\sigma(t)$ defines the effective width of the Gaussian function $h_{n_g j}(t)$ such that:

$$\sigma(t) = \sigma_0 \cdot \exp\left(-\frac{t}{\tau_1}\right)$$

with $\sigma_0$ being the radius of the SOM and $\tau_1$ being given as follows:

$$\tau_1 = \frac{\tau_2}{\log_e(\sigma_0)}$$

$$\tau_2 \approx \frac{N_{iter}}{2}$$

EXAMPLE 1

Classifying Signatures Measured on an AS365

The AS365 (Dauphin) is a 4-bladed helicopter. Measurements taken on an AS365 characterize the state of the out-of-adjustment rotor in two series of flights. On each flight, the adjustment errors, their points of application, and their magnitudes were different. A reference measurement (an in-adjustment rotor without any defect) was also taken.

The respective definitions of $E_c$ relative to $C_B$ and $C_D$ were as follows:

$$E_c = C_B \cup C_{ref}$$
$$= C_{blade1} \cup C_{blade2} \cup C_{blade3} \cup C_{blade4} \cup C_{ref}$$
$$E_c = C_D \cup C_{ref}$$
$$= d_{mass} \cup d_{rod} \cup d_{tabs} \cup C_{ref}$$

The learning sample was constituted by the first series of flights. The second series constituted the sample to be classified. The parameters structuring the network and the learning were set at $N_{iter}=500$, $N_c=30^2$, and $\sigma_0=3$.

After learning relative to $C_B$, it was found that the performance when classifying unlearned signatures was as follows: 90% of correct classification for an unsupervised SOM, and 100% correct classification for an SOM supervised using criterion A or criterion B.

FIGS. 7 and 8 show the deformation of the setpoint Voronoï diagram as a result of the supervised learning, respectively using criterion A and using criterion B.

Learning relative to $C_D$ is shown in FIGS. 9 and 10. It was found that classification performance was less good: 76% correct classification for an unsupervised SOM, 90% and 84% correct classification for an SOM supervised respectively using criterion A and using criterion B.

The lower performance might be due to confusion between signatures representative of out-of-adjustment tabs and those representative of out-of-adjustment rods.

EXAMPLE 2

Classifying Signatures Measured on an EC225

EC225 (Super Puma) is a 5-bladed helicopter. As in Example 1, measurements were taken during two series of flights (reference flight, flight with mass, rod, and tab adjustment errors), for errors of different amplitudes. The learning sample was constituted by the first series of flights, with the second series of flights constituting the classification sample.

The respective definitions of $E_c$ relative to $C_B$ and $C_D$ were as follows:

$$E_c = C_B \cup C_{ref}$$
$$= C_{blade1} \cup C_{blade2} \cup C_{blade3} \cup C_{blade4} \cup C_{blade5} \cup C_{ref}$$
$$E_c = C_D \cup C_{ref}$$
$$= d_{mass} \cup d_{rod} \cup d_{tabs} \cup C_{ref}$$

Vibratory measurements were taken over a length of time sufficient to achieve convergence of acceleration amplitudes and phases. A Fourier transform was used to generate a plurality of vibratory signatures from each time signal. This example served to analyze the capacity of the SOM and of the SSOM to classify signatures calculated from signals at the limit of convergence. Two signature databases were used:
  one database (database A) having 122 signatures calculated from signals of duration corresponding to 40 revolutions of the rotor; and
  a second database (database B) of 602 signatures calculated from time signals subdivided into five signals.

In spite of the measurements being taken into account on the ground (increasing the dimensions of the signatures) and in spite of a larger number of blades, the same values were conserved for the parameters structuring the network: $N_{iter}=500$, $N_c=30^2$, and $\sigma_0=3$.

The estimated performance in the databases A and B, for learning in $C_B$ and in $C_D$ of the algorithms SOM and SSOM (criteria A and B) were as follows:

| Algorithms | Supervision and classification relative to $C_B$ | | Supervision and classification relative to $C_D$ | |
| --- | --- | --- | --- | --- |
| | database A | database B | database A | database B |
| SOM | 78.69% | 78.69% | 84.43% | 92.93% |
| SSOM criterion A | 90.16% | 86.86% | 86.07% | 85.39% |
| SSOM criterion B | 88.52% | 86.30% | 88.54% | 95.10% |

The results show that the SSOM algorithm presents better performance in classifying signatures, in particular in $C_B$. However, approximately 6% of errors were found due to the indecision problem during classification by the SOM, whereas fewer than 2% were found with SSOM. The main classification error, both for SOM and SSOM, was due to poor positioning of signatures representing out-of-adjustment tabs. FIGS. 11 and 12 show the locations of the signatures in the database A in the plane of the SSOM (learning in $C_B$, criteria A and B).

The algorithm supervised by the criterion B is more sensitive to threshold problems at the limits of the boundary around the subspace of the signature representing an isotropic rotor. This difficulty is more limited when supervising using criterion A, since the algorithm recenters signatures around their reference neurons, thereby deforming the Voronoï diagram to a lesser extent, as shown in FIG. 11.

FIGS. 13 and 14 show the locations of the signatures of the database B in the plane of the SSOM (learning in $C_D$, criteria A and B).

With these two types of learning, the main errors were due to poor placement of signatures (for out-of-adjustment tabs) in the characteristic space of the SSOM in the vicinity of the discriminating boundary of $S_{C_{ref}}$.

With learning supervised by criterion A, it can be seen that these signatures are located outside $S_{C_{ref}}$, since the signatures are recentered around their respective setpoint neurons during learning.

With learning supervised by criterion B, the distribution of the learning sample took place on a maximum of available neurons, thereby having the effect of strongly deforming the Voronoï diagram, but not having any influence on classification performance. Errors in positioning signatures representative of out-of-adjustment tabs are situated along the boundaries, in particular around the reference subspace $S_{C_{ref}}$ shown in FIG. 14.

In FIGS. 7 to 14, the output space of the SSOM is represented by a square mesh. The use of a hexagonal lattice can help in reducing indecision and in making neighborhoods more uniform, with each neuron being positioned at equal distances from its neighboring neurons. It is also possible to use an irregular or "noisy" hexagonal lattice or mesh in which the coordinates are defined in the set R of real numbers by adding small-amplitude offsets $\Delta x$ and $\Delta y$ randomly to the coordinates of neurons disposed on a regular hexagonal lattice.

This can make it possible to limit the amount of superposition between the Voronoï diagram and the lattice, like using the Voronoï diagram calculated on the basis of barycenters, thereby conserving the precision of the partial Voronoï diagram relative to real decision boundaries, and conserving the advantage of the hexagonal lattice.

Diagnosis can be carried out in several steps: detecting defective or out-of-adjustment elements on a helicopter rotor, then locating those elements to indicate the action to be taken (adjustment or replacement) where necessary. At each step of diagnosis, it is possible to use one or more neural networks, each having a classification function in $C_B$ or $C_D$ for the purpose of benefiting from the increased classification performance by supervision.

Figure 15:
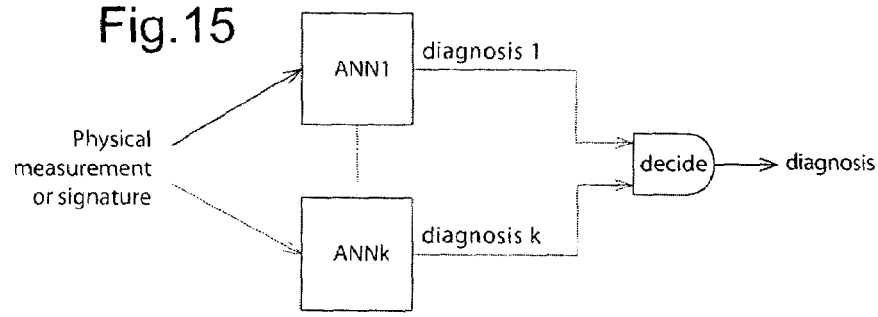
FIG. 15 is a diagram showing a redundant diagnosis system.

Independently of the quality of the measurements, the quality of the diagnosis depends on the richness of the learning database used and on the performance of the selected classifier. For diagnosis by algorithmic redundancy, as shown diagrammatically in FIG. 15, "first" diagnoses coming from a plurality of different classifiers are analyzed in order to propose a final diagnosis and in order to increase the robustness of the system. The criteria for analyzing the first diagnoses may be constituted, for SOM diagnosis, in particular by the distance measured between the elected neuron and the vibratory signature to be classified, by the number of successive neurons of identical class closest to the elected neuron, and/or by the proximity of the elected neuron to the boundaries of the Voronoï diagram.

Each of the "competing" diagnoses can be performed by a single SCLN, or by a hybrid method combining a plurality of SCLNs and ANNs in series and/or parallel.

Under such circumstances, each ANN/SCLN possesses its own sample of vibratory signatures for supervised learning, one relative to $C_B$ and the other relative to $C_D$.

Figure 16:
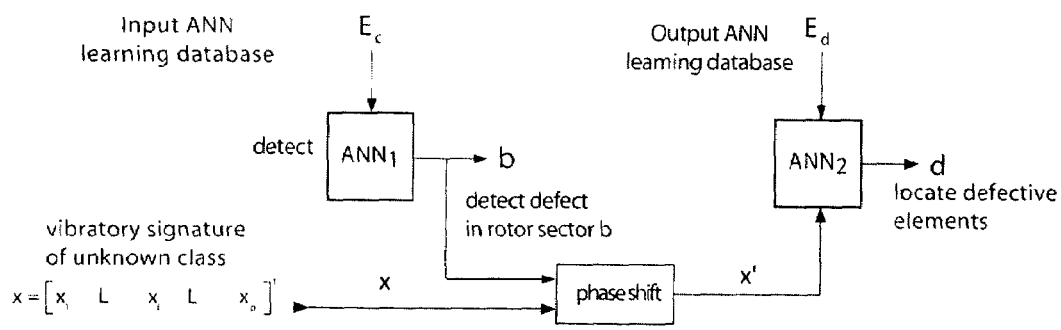
FIG. 16 is a diagram of a diagnosis system with serial architecture.

The diagnosis system can thus have two ANNs coupled in series as shown in FIG. 16. A first $ANN_1$ for input detects the presence of a defect in the helicopter rotor after learning a complete signature database $E_c$ containing signatures representative of identified defects and adjustment errors for each of the B sectors of the rotor (supervision relative to $C_B$), and also using the signature for an isotropic rotor:

$$E_c = \bigcup_{b=1}^{B} C_b \cup C_{ref}$$

$$C_b = \bigcup_{n=1}^{D} d_n$$

The second $ANN_2$ for output locates the detected defect element after learning from a smaller signature database $E_d$ constituted by signatures representative of defects and adjustment errors identified for a single sector of the rotor (e.g. the sector corresponding to b=1), and also the signature for an isotropic rotor:

$$E_d = C_l \cup C_{ref}$$

$$C_l = \bigcup_{\substack{n=1 \\ b=1}}^{D} d_n$$

During classification of a vibratory signature of unknown class $\underline{x}$, $ANN_1$ identifies, where appropriate, the sector $\underline{b}$ of the rotor in which a defective or adjustment-error element has been detected. Under such circumstances, the phases of the vibratory signature $\underline{x}$ are phase-shifted through an angle $\Psi$ in order to obtain the signature x' corresponding to the defective element of index $\underline{d}$ identifiable in the learning database $E_d$. The angle $\Psi$ is the angle formed between the sector $\underline{b}$ and the sector (1) of the rotor selected arbitrarily in order to define the learning database for $ANN_2$. The phase-offset relationship for each acceleration, for a B-bladed rotor, to the harmonics $\underline{h}$ is as follows:

$$\Psi = \frac{2\pi h(b-1)}{B}$$

The use of a small database $E_d$ serves to reduce the complexity of the decision boundaries and the complexity of the Voronoï diagram.

The input network may be an SSON (or a SSOM), and the output network may be an optionally supervised network, in particular a VQ, LVQ, or (S)SOM network.

With classification performance close to 90% to 95% for each network, classification performance is obtained for the series hybrid ANN that is greater than 85%.

Figure 17:
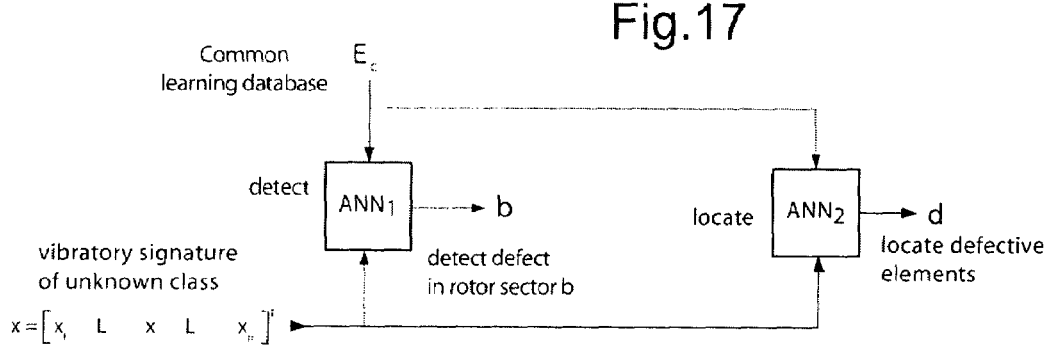
FIG. 17 shows another example of a diagnosis system, but with parallel architecture.

Another hybrid configuration shown in FIG. 17 is obtained by associating two networks in parallel, each possessing the complete learning database $E_c$. During learning, a first network $ANN_1$ dedicated to detection is supervised relative to $C_B$, and a second network $ANN_2$ dedicated to location is supervised relative to $C_D$.

This configuration benefits from the optimum performance obtained by supervising relative to $C_B$ or to $C_D$. In the most unfavorable circumstance, if the classification errors do not superpose, the error rates obtained for classification relative to $C_B$ and to $C_D$ combine additively. The reliability of the results obtained with this diagnosis method was greater than 88%.

What is claimed is:

1. A method of detecting and identifying a defect or an adjustment error of a rotorcraft rotor using an artificial neural network (ANN), the rotor having a plurality of blades and a plurality of adjustment members associated with each blade, wherein the network (ANN) is a supervised competitive learning network having an input to which vibration spectral data measured on the rotorcraft is applied, the network outputting data representative of which rotor blade presents a defect or an adjustment error or data representative of no defect, and where appropriate data representative of the type of defect that has been detected in which a learning algorithm is used of the supervised self-organizing network type, and the output space is one of the group consisting of i) a square mesh, ii) a hexagonal mesh, and iii) an irregular mesh.

2. A method according to claim 1, in which the data applied to the input of the network is a sequence of vibration modulus and phase data corresponding to harmonics of the rotation frequency of the rotor.

3. A method according to claim 1, in which the supervised competitive learning network includes a layer of competitive neurons given synaptic weights, the number of said weights being equal to the dimension of the spectral data vectors used.

4. A method according to claim 3, in which the number of competitive neurons is greater than the dimension of the spectral data vectors.

5. A method according to claim 3, in which, from the competitive neurons, an elected neuron is determined with which the associated synaptic weight vector is the closest to a spectral data vector presented as input, in particular by calculating a Euclidean distance between said vectors.

6. A method according to claim 1, in which, in order to supervise learning, data is added to each spectral data vector used for network learning, said added data being representative of the membership of the vector in question to a class corresponding to a determined type of defect or adjustment error.

7. A method according to claim 1, in which a supervised vector quantization algorithm (LVQ) is used for network learning, in particular an algorithm selected from the following algorithms: LVQ1, OLVQ1, LVQ2, LVQ2.1, LVQ3, MLVQ3, GLVQ, DSLVQ, RLVQ, GRLVQ.

8. A method according to claim 1, in which the dimension of the output space of the network is equal to two.

9. A method according to claim 1, in which the dimension of the output space of the network is equal to three.

10. A method according to claim 1, to supervise learning, a partitioning of the output space into subspaces is defined and the weights of the competitive neurons are modified as a function of their membership to one or another of these subspaces.

11. A method according to claim 10, in which the partitioning is substantially regular, radial, and centered, and the number of subspaces is equal to the number of classes of defect or adjustment error plus one.

12. A method according to claim 10, in which, in order to define the partitioning, the coordinates in the output space are determined for a setpoint neuron associated with a class of defect or adjustment error.

13. A method according to claim 10, in which, to supervise learning, a neighborhood function is centered on the neuron corresponding to the barycenter in the output space of the elected neuron and of the setpoint neuron corresponding to the class of the current spectral data vector.

14. A method according to claim 10, in which, to supervise learning, competition is restricted to the neurons of the subspace corresponding to the class of the current spectrum data vector.

15. A method according to claim 1, in which a plurality of networks are used connected in series, and including at least one supervised competitive learning network.

16. A method according to claim 1, in which a plurality of networks are used connected in parallel and including at least one supervised competitive learning network.

17. A method according to claim 1, in which a plurality of redundant networks are used including at least one supervised competitive learning network.

18. A method according to claim 1, in which:
a supervised first competitive learning network is used to determine data identifying at least one defective or out-of-adjustment blade; and
a non-supervised second competitive learning network is used to determine data identifying at least one defect or adjustment error of the defective or out-of-adjustment blade.

19. A method according to claim 1, in which an irregular mesh is used in the output space.

20. A method according to claim 19, in which a mesh is used presenting coordinates defined in the set of real numbers.

21. A system for detecting and identifying a defect or adjustment error of a rotorcraft rotor, the system comprising:
a member for reading a data medium and organized to read data of measurements taken on the rotorcraft;
a database containing reference vibratory signature data for the rotorcraft;
a device for processing the measurement data from the time domain to the frequency domain, which device is connected to the read member in order to receive the measurement data therefrom and to output vibratory signatures for analysis; and
a calculation member connected to the database and to the processing device and programmed to perform the operations of a method according to claim 1.

22. A method of detecting and identifying a defect or an adjustment error of a rotorcraft rotor using an artificial neural network (ANN), the rotor having a plurality of blades and a plurality of adjustment members associated with each blade, wherein the network (ANN) is a supervised competitive learning network having an input to which vibration spectral data measured on the rotorcraft is applied, the network outputting data representative of which rotor blade presents a defect or an adjustment error or data representative of no defect, and where appropriate data representative of the type of defect that has been detected in which a learning algorithm is used of the supervised self-organizing network type, and in which a square mesh is used in the output space.

23. A method of detecting and identifying a defect or an adjustment error of a rotorcraft rotor using an artificial neural network (ANN), the rotor having a plurality of blades and a plurality of adjustment members associated with each blade, wherein the network (ANN) is a supervised competitive learning network having an input to which vibration spectral data measured on the rotorcraft is applied, the network outputting data representative of which rotor blade presents a defect or an adjustment error or data representative of no defect, and where appropriate data representative of the type of defect that has been detected in which a learning algorithm is used of the supervised self-organizing network type, and in which a hexagonal mesh is used in the output space.

* * * * *